United States Patent [19]

Walowit

[11] Patent Number: 4,941,038
[45] Date of Patent: Jul. 10, 1990

[54] METHOD FOR COLOR IMAGE PROCESSING

[75] Inventor: Eric Walowit, Springboro, Ohio

[73] Assignee: The Mead Corporation, Dayton, Ohio

[21] Appl. No.: 297,223

[22] Filed: Jan. 13, 1989

Related U.S. Application Data

[63] Continuation-in-part of Ser. No. 48,156, May 11, 1987.

[51] Int. Cl.⁵ .................................................. G03F 3/08
[52] U.S. Cl. .......................................... 358/80; 358/75; 358/78
[58] Field of Search ............................. 358/75, 80, 78

[56] References Cited

U.S. PATENT DOCUMENTS

| | | | |
|---|---|---|---|
| 4,488,245 | 12/1984 | Daike et al. | 358/80 |
| 4,736,245 | 4/1988 | Seto et al. | 358/80 |
| 4,736,310 | 4/1988 | Colthorpe et al. | 358/75 |
| 4,758,885 | 7/1988 | Sasaki et al. | 358/80 |
| 4,839,721 | 6/1989 | Abdulwahab et al. | 358/80 |
| 4,845,551 | 7/1989 | Matsumoto | 358/80 |

*Primary Examiner*—James J. Groody
*Assistant Examiner*—Kim Yen Vu
*Attorney, Agent, or Firm*—Thomas A. Boshinski

[57] ABSTRACT

A method for processing color image data converts input RGB color data to output CMY color data. An input device is calibrated to a intermediate color space, and an output device is calibrated to the intermediate color space. The input RGB color data is collected from the input device, and is converted to intermediate color space data. The intermediate color space data is converted to the output CMY color data, and is outputted to the output device. During the conversion process, the image data is processed to compensate for gamut mismatch.

25 Claims, 7 Drawing Sheets

METHOD FOR COLOR IMAGE PROCESSING

RELATED APPLICATION

This application is a continuation-in-part of U.S. patent application Ser. No. 048,156, filed May 11, 1987.

BACKGROUND OF THE INVENTION

The present invention relates generally to the production of images on a imaging media, and more particularly, to a method for forming a full color image such that input data relating to an original color image is processed so that an observer of the output image will perceive close color correspondence between the two images.

The actual or perceived quality of an imaging system depends to a large extent upon the degree to which the output appears to match the input image. In the case of a color image reproduction system, wherein an input color image is copied as an output color image, the match between input and output extends to the color content of the image as well as the achromatic subject information. Thus, the various shades and intensities of the different colors must be properly matched. Ideally, the colors of the output image should be indistinguishable from those of the input image.

Copies may be made, for example, on photosensitive material of the type described in U.S. Pat. Nos. 4,399,209 and 4,440,846. For this output media, the output data must be placed in the form of Cyan, Magenta and Yellow. For other types of output devices and media, other forms for the output data will be required.

In order that the output image will properly match the input image for color content, it is necessary to color calibrate the output device to the input device. This is typically done manually and subjectively, performed for each color channel independently. This results in a cumbersome trial and error method, and furthermore results in a proper calibration match only between the particular input and output devices involved. To substitute a different input and/or output device, as might be done in a large color image production system, the calibration must be performed again.

A second problem results from the fact that any input device has a limited gamut or range of colors which it is capable of detecting. At the same time, an output device has a limited gamut of colors which it can reproduce. For a given image reproduction apparatus, the input gamut and output gamut are likely not to be coextensive, and in fact may have substantial areas in which the two do not match.

Often times, this may not be a problem where the input device cannot detect colors which the output device is capable of printing, other than to cause a situation wherein the full range available from the output device is not utilized. More serious is the situation in which an input color is detected, but cannot be reproduced by the output device. Since these particular elements of the image cannot be simply left blank, some decision must be made as to how such information is to be represented. Such determinations can be made empirically for the entire gamut, but this can be a tedious task. Moreover, it becomes quite impractical for an apparatus in which input and/or output devices of different types may be interchanged.

What is needed, therefore, is a method for image processing which is useable in reproducing input information to output image information regardless of the particular input and output devices used. Moreover, such a method should be capable of facilitating the interchanging of input and output devices, and should be capable of compensating for gamut mismatch between the input and output devices selected.

SUMMARY OF THE INVENTION

Accordingly, the present invention provides a method for converting input color data to output color data wherein the input color data is collected from an input device. The input data is then converted to data corresponding to a predetermined intermediate color space, which may preferably be a uniform color space. The data is next converted from the intermediate color space data to output color data, and then is outputted to an output device.

Alternatively, the present invention provides of converting input, preferably RGB, color data to output, preferably CMY, color data, wherein an input device is calibrated in a first calibration to an intermediate and preferably uniform color space. An output device is calibrated in a second calibration to the same uniform color space. The input RGB color data from the input device is collected, and is converted to uniform color space data in accordance with the first calibration. The uniform color space data is then converted to output CMY color data in accordance with the second calibration. Finally, the output CMY color data is outputted to the output device.

The first calibration may comprise the steps of measuring colorimetrically a plurality of color patches to obtain a set of device independent color input values corresponding to the patches. The patches are measured with the input device to obtain a set of device dependent color input values corresponding to the patches. The independent and dependent color input values are correlated, and other device independent color input values are interpolated from the set to correspond to input not represented by the patches. An input lookup table is created from the device independent and device dependent color input values to map the input RGB color data to the uniform color space data.

The second calibration may comprise the steps of printing with the output device a plurality of color patches in accordance with a set of device dependent color output values. The patches are measured colorimetrically to obtain a set of device independent color output values corresponding to the patches. The device independent and dependent color output values are correlated, and other device independent color output values are interpolated from the set to correspond to output not represented by the patches. An output lookup table is created from the device independent and device dependent color output values so as to map the uniform color space data to the output CMY color data.

Converting the uniform color space data to the output CMY color data may include processing the uniform color space data to match an input gamut for the input device to an output gamut for the output device. This processing may include identifying at least one unprintable device independent color value which, when converted to a device dependent output value, cannot be represented by the output device. An adjusted device dependent color value is then determined to represent the unprintable color output value.

The adjusted device dependent color value is determined within the uniform color space. This adjusted value may be determined as the shortest vector distance within the uniform color space between the unprintable color output value and a color output value which is printable by the output device. This shortest vector value distance may be determined while maintaining at least one of the coordinates within the uniform color space as constant.

In a preferred embodiment, the uniform color space may be defined by the coordinates lightness, chroma and hue. In such case, the one coordinate which is maintained as constant may be lightness. In addition, the hue coordinate may also be maintained as constant. In some cases, lightness may also require compression.

As an alternative approach, the adjusted color value may be determined by maintaining two coordinates within the uniform color spaces constant, and compressing all color input values along a third coordinate between zero and the unprintable coordinate value until the unprintable value is within the output color gamut. In such a case, and where the uniform color space is defined by the coordinates lightness, chroma and hue, the third coordinate may be the chroma coordinate.

Accordingly, it is an object of the invention to provide a method for color processing of image data within an image reproduction system; to provide such a method which is useable with a variety of input and/or output devices; to provide such a method which facilitates the interchanging of input devices or output devices; and to provide such a method which corrects for gamut mismatch between the input and output devices.

Other objects and advantages of the present invention will be readily apparent from the following description, the accompanying the drawings and the appended claims.

DETAILED DESCRIPTION OF THE INVENTION

Figure 1:
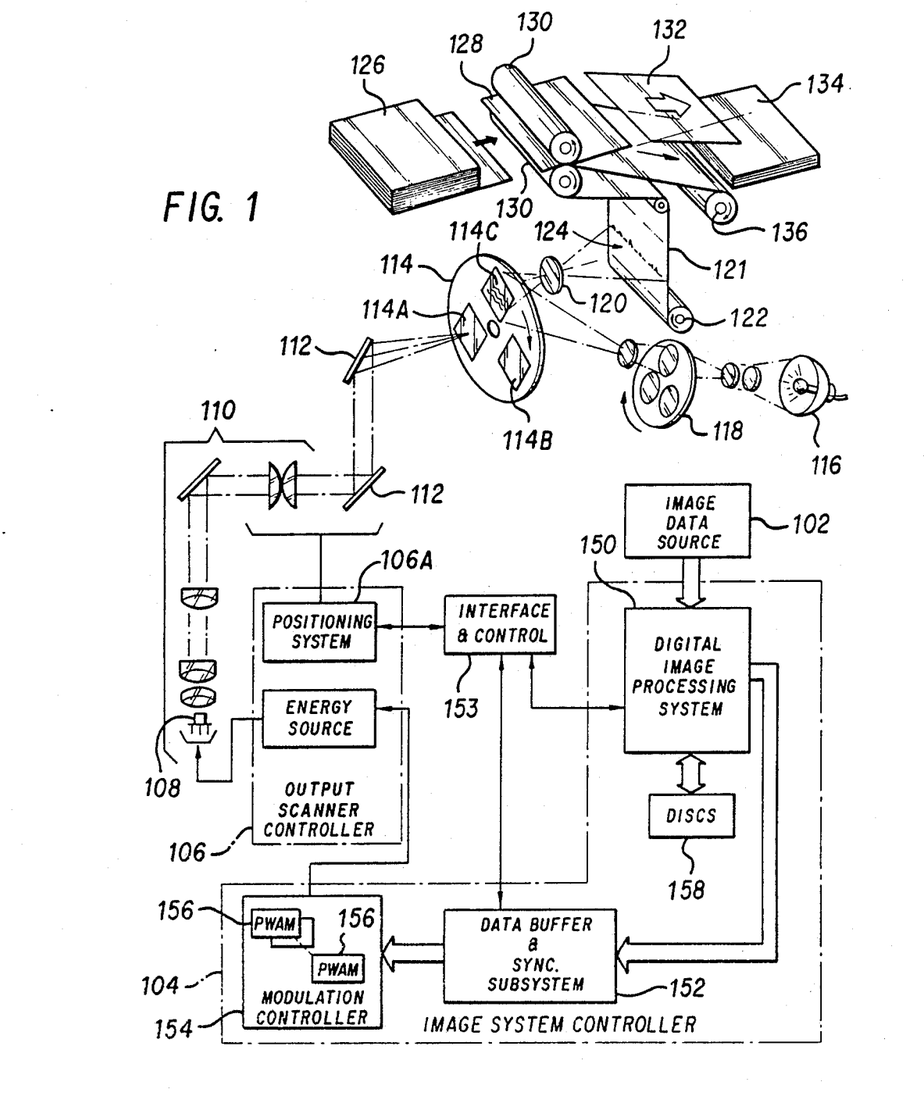
FIG. 1 is a schematic block diagram of an imaging system in accordance with which the present invention may be used.

While the method of the present invention can be used in conjunction with imaging a variety of imaging media, it is particularly applicable to the Mead imaging media described above, and accordingly, will be described with reference to such media. Further, while the present invention may be used with a variety of imaging systems, an exemplary system is shown in FIG. 1, as imaging system 100. This system produces color images representative of image data on Mead imaging media. In the illustrated embodiment, the images are transferred to final copy sheets which include developer material utilized in accordance with one embodiment of the Mead imaging media.

The imaging system 100 shown in FIG. 1 includes input data source device 102 for providing image data defining an image to be produced on an imaging media. The input data device 102 can be a scanner for reproducing originals, or any other data source, such as a computer graphics system. The image data is transferred to an image system controller 104 which includes data processing means for receiving the image data and converting the image data into signals which are passed to an output device or writing means. In the illustrated embodiment, the writing means includes an output scanner controller 106 which receives amplitude and/or pulse width signals from image system controller 104. Controller 106 in turn controls a laser diode 108, a dynamic focusing system 110, and a galvanometer mirror system 112 which serves to scan the focused laser beam in both the X and Y directions onto a light valve 114 to produce marks of varying sizes, densities and/or shapes on the light valve.

The light valve 114 is illustrated as comprising a rotating turret containing three light valves of the thermal smectic type which preferably comprise liquid crystal light modulators 114A, 114B and 114C, with the light modulator 114A being shown in the scan position to produce an image thereon in FIG. 1. The use of three light modulators 114A–114C permits a full three-color image to be produced provided, of course, that the input image data provides full three-color image information, typically, red, green and blue (RGB) primary colorants. The RGB input information is processed and converted to corresponding appropriate output color information, such as cyan, magenta and yellow (CMY) colorants, in a manner to be described in detail herein. If the resulting cyan image information is transferred, for example, to the light modulator 114A, then the resulting magenta image information is transferred to the light modulator 114B, and the resulting yellow image information is transferred to the light modulator 114C. In the illustrated embodiment, three liquid crystal light modulators 114A–114C are utilized; however, additional light modulators can be used for separate black image data or other primary colorants or, indeed, a single full-color light modulator could be used.

Figure 2:
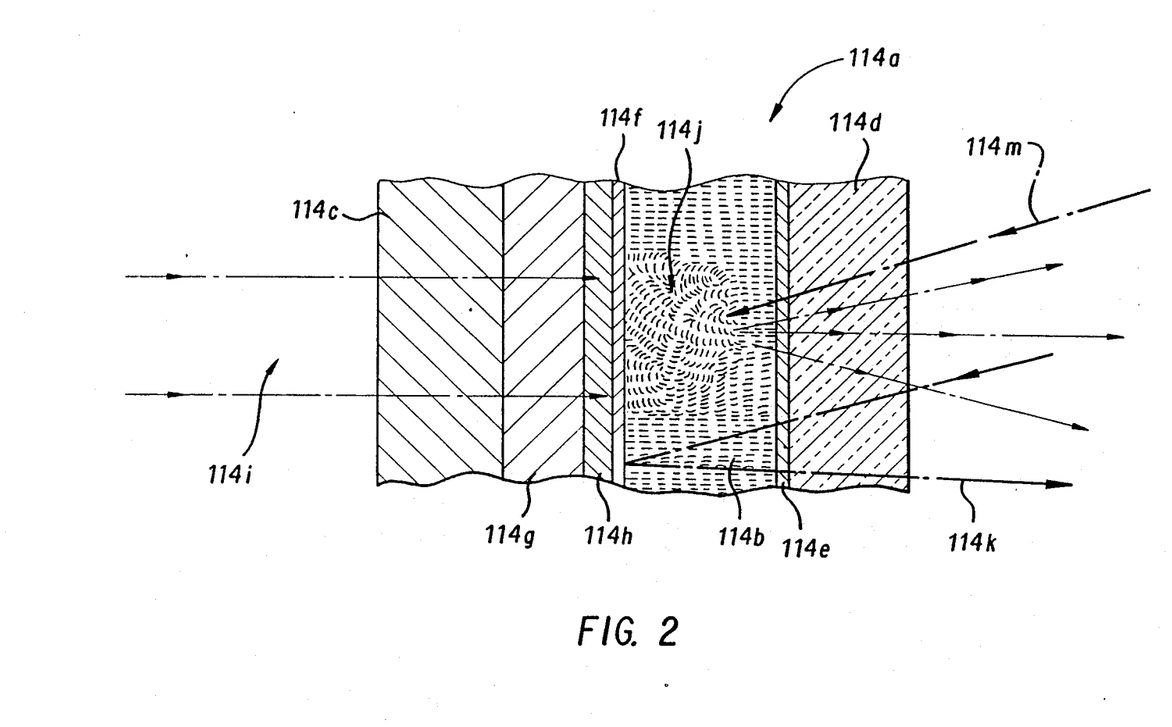
FIG. 2 illustrates the construction of a liquid crystal light modulator suitable for use in the present invention.

In the illustrated embodiment, the light modulators 114A–114C are of a type to be written from one side and read from the other or printing side of the light modulators by means of reflecting appropriate actinic radiation from the light modulators 114A–114C and focusing it upon the media to be imaged. An example of a preferred liquid crystal light modulator is shown in FIG. 2. The modulator includes cell 114a which contains a liquid crystal layer 114b. Any suitable liquid-crystal material of the smectic-A class may be used. Heat is applied to the liquid crystal material to transform the material into the isotropic state to form light-scattering regions. Afterwards, the liquid crystal is cooled back to the smectic state. The written scattering regions are then stable within the smectic temperature range of the specific liquid crystal material, and the written information will be preserved.

Cell 114a is supported by a pair of transparent substrate layers 114c and 114d, which layers are preferably formed from glass. Located between substrate layer 114d and liquid crystal material 114b is a layer of a transparent electrically conductive material 114e. This transparent layer is preferably formed from indium-tin oxide. A second electrically conductive layer 114f formed from a reflective material, such as aluminum, for reasons to be described below, is located adjacent the liquid crystal layer 114b opposite layer 114e. Layers 114e and 114f together act as conductors for use in erasing the liquid crystal cell 114a. An electric field can be generated between layers 114e and 114f to realign the liquid crystal into a totaling non-scattering, transparent state.

Located between substrate layer 114c and layer 114f is an anti-reflection layer 114g, preferably formed from a dielectric material, and an infrared absorber layer 114h, preferably formed from aluminum and/or chromium. In writing information onto the cell 114a, an infrared laser diode or other source produces a laser beam which is directed onto the cell 114a in the manner generally indicated by beam 114i in FIG. 2. The beam 114i passes through transparent substrate layer 114c and into absorber layer 114h. As the laser radiation is absorbed, heat is generated in the absorber layer 114h. This heat then acts upon the liquid crystal material within layer 114b through reflector layer 114f to create the scattering regions corresponding to the image information to be recorded.

A scattering region is shown in FIG. 2 within cell 114a generally at 114j. Here, the molecules of the liquid crystal have been arrayed in random fashion, as contrasted with the uniform, aligned manner of the molecules in the non-scattering regions. It is the high scattering profile of the written area which, when contrasted with the low scattering profile of the unwritten area, causes the appearance of a mark.

Because the mechanism for writing on the liquid crystal material is thermal, it is possible to effectively "grow" marks in the liquid crystal material. If laser beam 114i is permitted to heat absorber layer 114h, heat will initially be applied within the portion of absorber layer 114h falling within the beam cross-section. However, if heat is applied for a relatively long period, it will extend by thermal conductivity beyond the beam cross-section, thereby creating a mark of greater diameter than the beam 114i. Moreover, the intensity of the radiation within the beam is not uniform, but rather is Gaussian, with a central region having greater intensity than the outer regions. Thus, it is also possible to write a mark having a diameter smaller than the beam 114i by terminating exposure to the beam after a relatively short time. It has been found that, with the apparatus of the preferred embodiment, it is possible, with a laser beam having a diameter of 20 microns, to write marks having diameters within the range of approximately 7 to 100 microns.

After cell 114a has been written, the image can be projected onto a photosensitive media by directing projection light onto the cell through glass substrate 114d. The projection light may, as illustrated by ray 114k, strike a non-scattering region of the liquid crystal layer 114b. This light passes through the liquid crystal material and is reflected by reflector layer 114f. The projection light then is returned through the liquid crystal material 114b and glass substrate layer 114d, and is directed onto the photosensitive media for exposure of the media. As illustrated by ray 114m, projection light which is directed onto scattering region 114j is scattered by the randomly oriented molecules. Very little of the incident light thus reaches the photosensitive media, and the media is left effectively unexposed.

In the illustrated embodiment, a source 116 of actinic radiation is directed upon the printing side of the light modulator which is rotated into the appropriate position, the position of the light modulator 114C as shown in FIG. 1. The actinic radiation is passed through one of the filters in a filter wheel 118 such that the corresponding frequencies of radiation for cyan, magenta and yellow are reflected from the light modulator positioned in the location of 114C and focused onto imaging media by means of a lens system 120. The light modulators 114A–114C and the filter wheel 118 are rotated in synchronism to provide desired filtering for a given light modulator.

In the illustrative embodiment, the Mead imaging media 121, which is of a transfer variety as described in the above-referenced Mead patents, is provided in a continuous roll 122 of the media. The media 121 is scrolled such that it passes through an exposure station 124 for being imaged by the actinic radiation from the source 116 reflected from the light modulator in the position of light modulator 114C. The imaging media 121 which has now been imaged at the exposure station 124 is moved to synchronize with a source of transfer sheets 126. The imaged area of the imaging media 121 is aligned with a single transfer sheet 128 and passed through pressure rollers 130 or the like to develop the image and transfer it to the transfer sheet 128 resulting in a reproduction 132 of an image corresponding to the image data provided from the image data source 102. The reproduced images are then positioned in a stack 134 and the used imaging media 121 is accumulated on a take-up reel 136.

One example of the image data means 102 is a document scanner produced by Sharp, which samples at 300 elements per inch and provides 8 bits of information for each of the three primary colors (RGB) for each sample element of an image or document being scanned. Hence, the image data comprises up to 24 bits of information (8 bits for each of the three primary colors RGB) for each sample element of an image to be reproduced by the imaging system 100. As a result, the incoming data can represent 256 levels of intensity for each of the primary colors of each sample element of the scanned original.

The image system controller 104 consists of three subsystems: a digital image processing subsystem 150 performs halftone and color processing; a data buffer and synchronization subsystem 152 synchronizes the transfer of processed image data from the digital image processing subsystem 150; and, a modulation controller subsystem 154 converts the digital image data to the actual pulse width and/or amplitude signals that control the laser 108 for writing a liquid crystal light modulator 114.

The digital image processing subsystem 150 takes the original image data and requantizes it to allow spatial and color reproduction of the original when imaged by the system. This requantization requires several operations. Initially, if halftoning is desired, the imaging data is thresholded. The thresholding is multilevel which is an extension of conventional binary thresholding. Binary thresholding provides a bilevel output, i.e., for 8 bits of input data, values between 0 and X are assigned, say, a "0" value and values between X+1 and 255 are assigned, say, a "1" value, where X is any value between 0 and 255.

In the multilevel thresholding arrangement, the data is sorted into $2^n$ different "bins" or values, where n is the number of bits to which the data is reduced, by dividing the possible number of input levels into 2n different steps. Each bin therefore encompasses a range of possible input levels, and represents one possible output level. The bins may each include an equal number of input increments, or the increments may be unevenly distributed. The gray scale value of a given sample element is thus assigned a value equal to the output level to which it is closest. In one simple example, an 8 bit input includes 256 levels. For a 4 bit output, 16 steps of 17 increments each maybe defined, with the output levels being defined by 0, 17, 34 and so forth up to 255. Accordingly, in this example, the 8 bits of information are processed to a 4 bit output, or 16 different levels, based on the multilevel thresholding arrangement.

Conventional binary error reduction techniques, such as Floyd Steinberg error diffusion and dithering techniques, are also expanded for multilevel application in the present invention.

Color processing, in accordance with the present invention, requires one or more operations to convert the input RGB color data to the output CMY color data supplied to the writing means. Not only must this conversion be carried out in a manner that causes input colors to be accurately matched to output colors, but compensation must be made for the limitations of the input and/or output devices used.

For color processing, first it is necessary to calibrate the input and output devices to establish a color palette. These calibrations are made colorimetrically utilizing the absolute color coordinates of the input and output data. In this manner, objective decisions as to how to deal with the color image data can be made in such a way that perceptual deviations are minimized.

Figure 3:
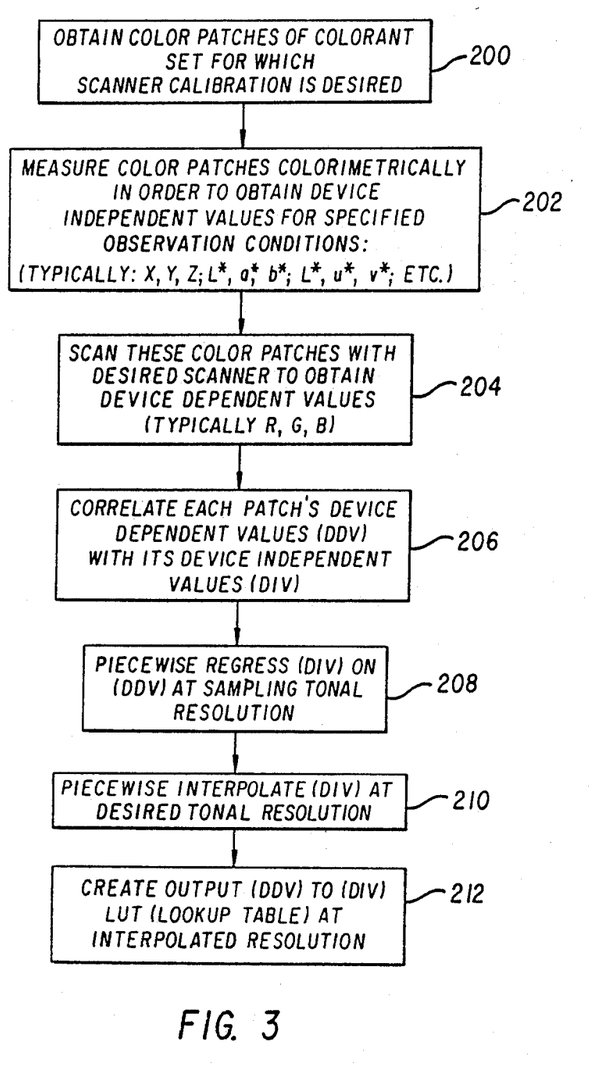
FIG. 3 is a flow diagram summarizing the calibration of an input device.

Consider first the input device calibration, which is summarized in the flow chart of FIG. 3. The initial step (block 200) is to obtain color samples or patches of a colorant set for which the scanner calibration is desired. These patches are measured colorimetrically (block 202) in order to obtain device independent values for specified observation conditions. Any known technique for such colorimetric measurements can be used, and the obtained measurements can be reported using any variables. However, it is preferred to work within a uniform color space whose characteristics have been well-established in the industry. For example, one such space is defined as $L^*, u^*, v^*$, and may be worked in using the cylindrical coordinates lightness, chroma and hue. This color space has the advantageous attribute that the chromatic and achromatic color component vectors can be operated on independently with approximate stationarity.

Next, the same color patches are scanned (block 204) using the input device in question. The information is stored in the computer by digitizing, and the device dependent and device independent values corresponding to the same patch are correlated (block 206). A regression of the device independent values onto the device dependent values is performed (block 208) to determine the relationship between these values. Intermediate values at the desired tonal resolution are next interpolated (block 210), and a look-up table mapping the device dependent to the device independent values is created (block 212).

Figure 4:
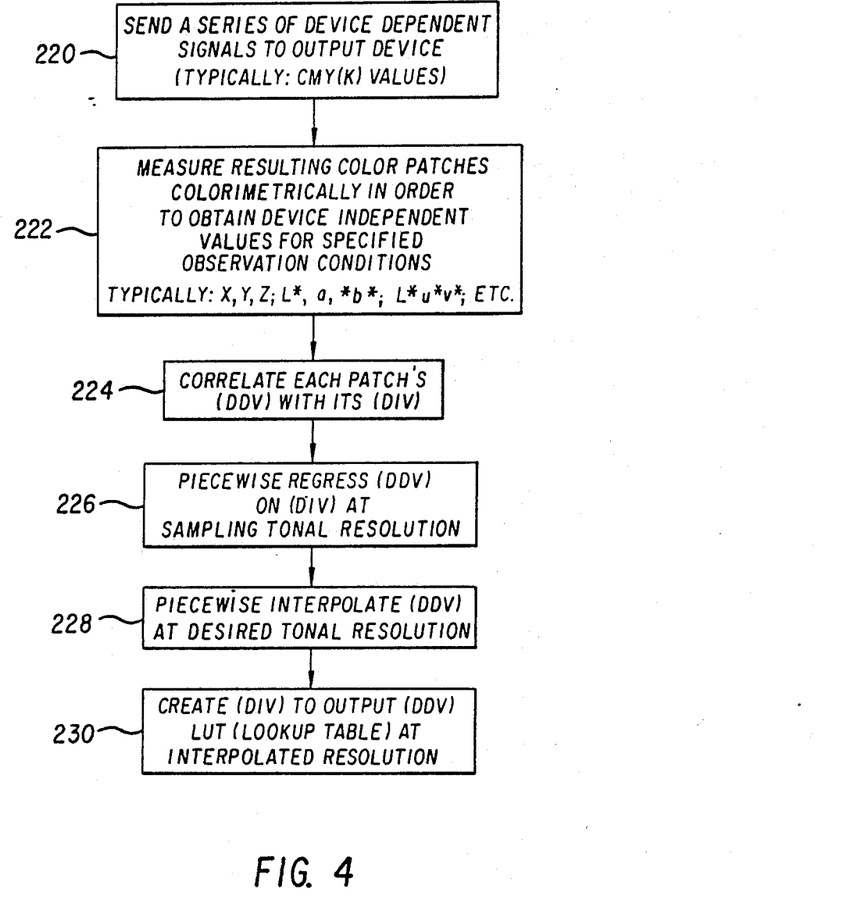
FIG. 4 is a flow diagram summarizing the calibration of an output device.

A similar procedure is used for the output device calibration, shown in summarized form in FIG. 4. In this case a series of device dependent signals are sent to the output device, which creates a set of color patches (block 220). These patches are in turn colorimetrically measured (block 222) to obtain device independent values for specified observation conditions. The dependent and independent output values are correlated (block 224), and a regression of dependent values onto independent values is performed (block 226). Other device dependent values are interpolated at the desired tonal resolution (block 228). A look-up table is created (block 230) mapping the device independent values to the device dependent output values.

Several methods have been developed to perform the regression of device independent values onto device dependent values, whether input or output. The choice of method depends on the nature of the device and the type of data the system will be utilizing. If the colorimetric quality factor of the device is high, then a simple set of three equations and three unknowns may be set up and solved for the matrix rotation between dependent and independent values. For an input scanner, this is the case when the scanner "sees" in a manner similar to the average human observer color matching functions and the scanner primary color responses are a linear combination of the matching functions.

This is not typically the case, however, due to low colorimetric quality factor and other non-linearities. This is particularly true of typical output devices whose CMY primaries build in a highly non-linear process in part characterized by their characteristic sensitometric curves as manifested by a particular output system. Thus, this global fit approach, based on the assumption that the system is linear over the entire color space, may not produce sufficiently accurate results.

As an alternative, the entire color space may be broken up into subsets of smaller color spaces, and each space may be fit with an appropriate set of equations. This is based on an assumption of local linearity within the subspaces and can be quite valid, particularly if the sampling frequency is high. Thus, for each subspace, several points geometrically close to the desired point are identified. A fitting function of the color space onto RGB or CMY is chosen, fitted and the point is computed. This is repeated for all points in color space of interest at the interpolating resolution required.

Figure 5A:
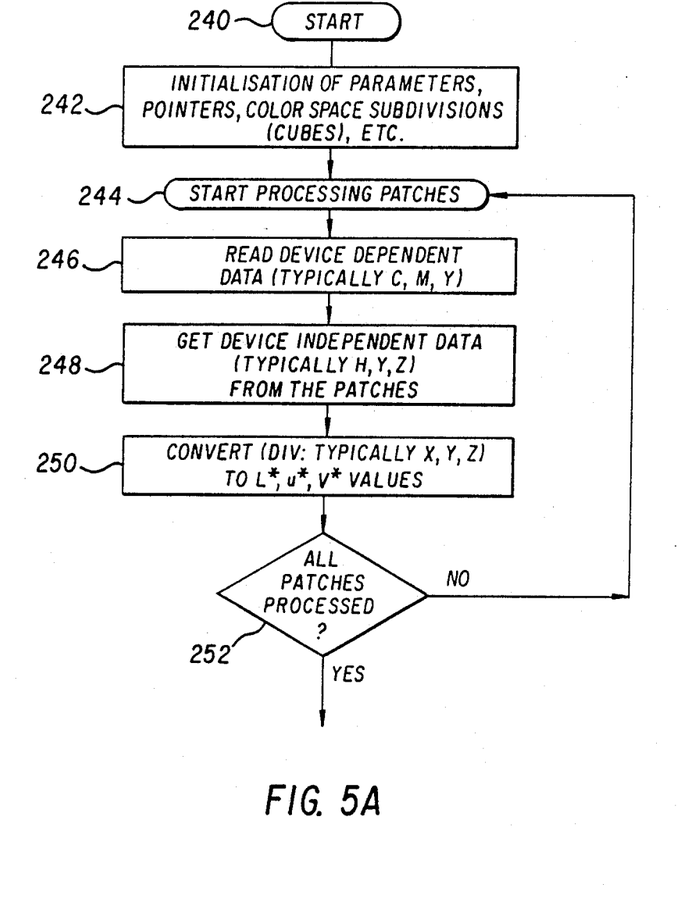
FIG. 5, comprised of FIGS. 5A, 5B and 5C, is a flow diagram illustrating in detail the calibration of an output device.
Figure 5B:
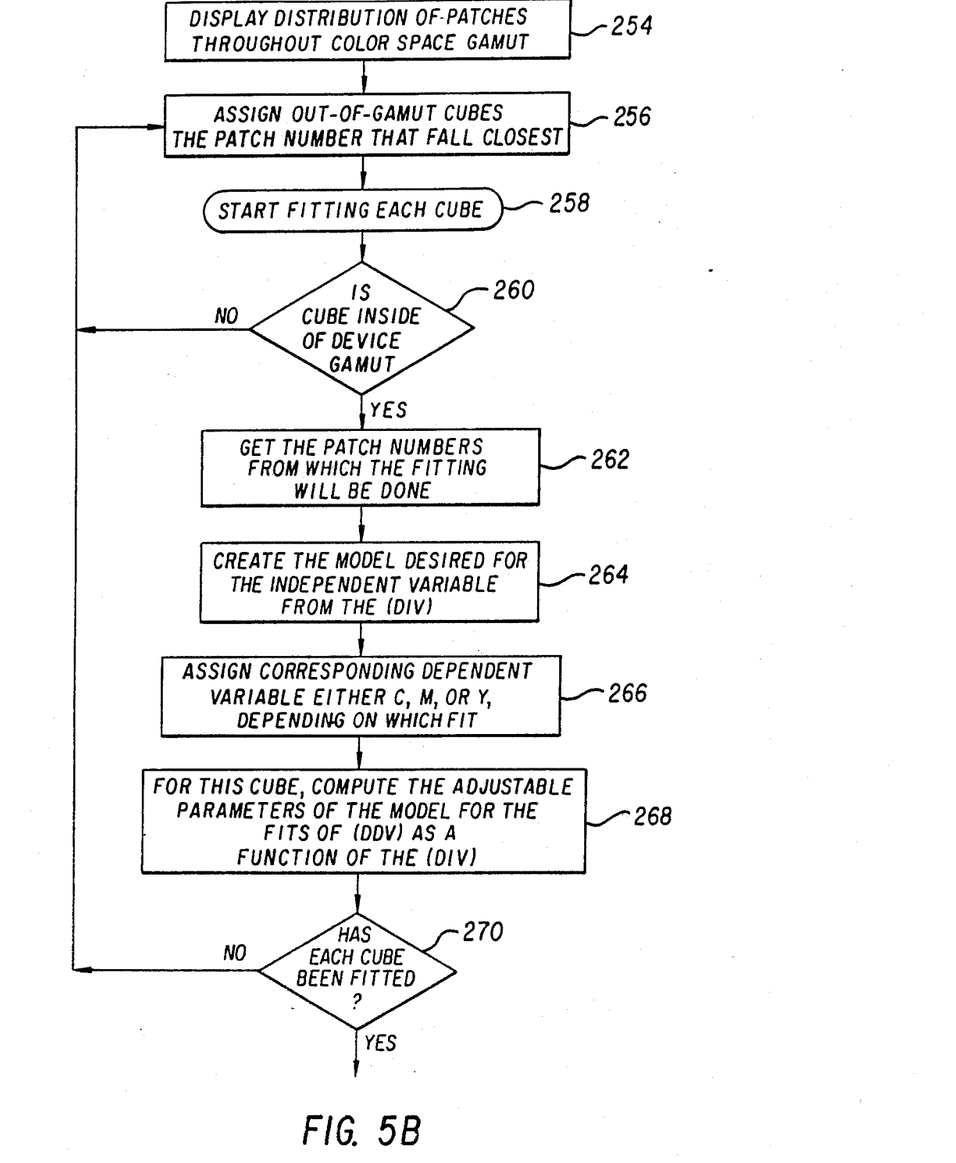
Figure 5C:
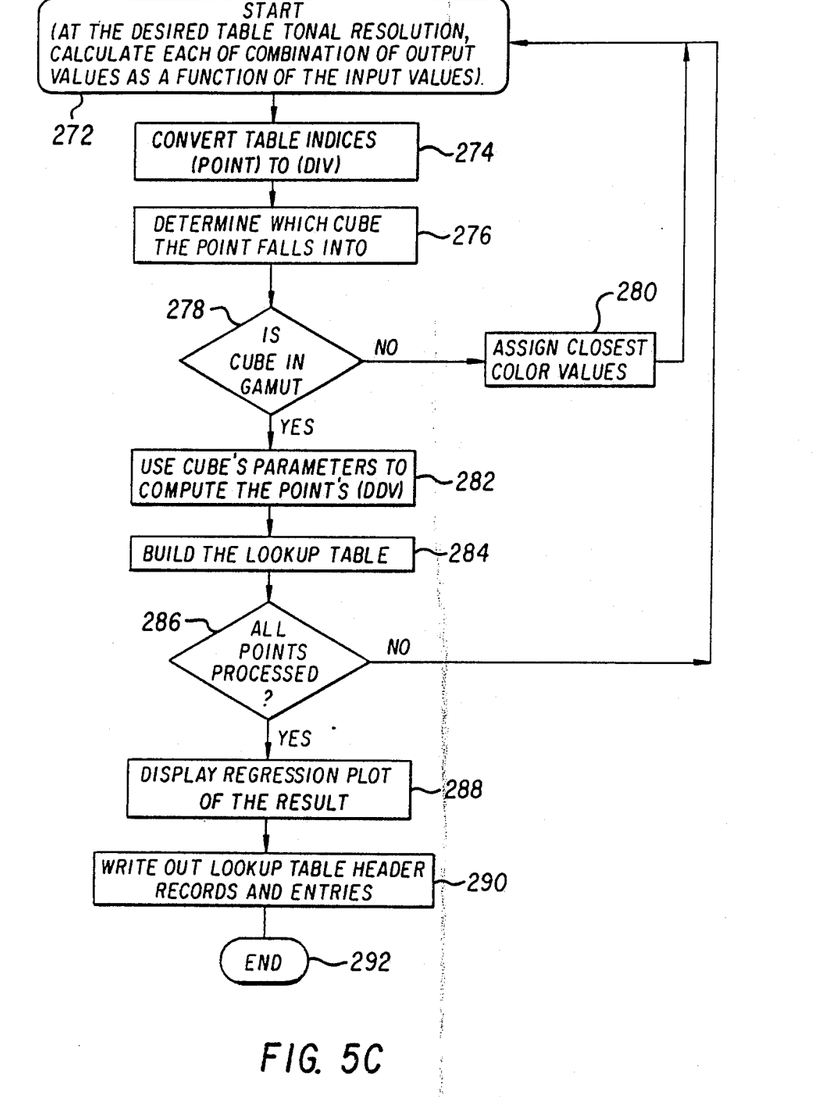

An example of this technique for calibrating an output device is illustrated in the flow chart of FIG. 5. Upon starting the procedure (block 240), the system is initialized (block 242) to reset all parameters, pointers, and the like. At the same time, the color space gamut is divided into a plurality of subspaces. Color patches, which have been previously printed by the output device in accordance with device dependent color data are processed (block 244), wherein the device dependent data used to print the patches is read from memory (block 246), and the colorimetrically measured device independent data is obtained (block 248) and converted to uniform color space values (block 250).

Once all patches have been processed (block 252), a computer display screen or the like may be used to display the distribution of printed and measured patches throughout the color space gamut (block 254). Any subspaces which fall outside of the device gamut, i.e., any subspaces which contain no points corresponding to the patches, are assigned the patch number which is closest thereto (block 256).

The fitting of each subspace to the output data is begun (block 258), with the initial inquiry whether the subspace under consideration is even in the device gamut (block 260). If not, no further fitting is performed for that subspace, and another is selected. For a subspace within the gamut, those patches which fall into the subspace and on the basis of which the fit will be made are selected (block 262). A desired model is created for the independent variable from the device independent values (block 264), and a corresponding dependent variable of C, M or Y is assigned depending on the fit being performed (block 266). For the subspace, the adjustable parameters of the model are computed for the fits of device dependent values as a function of device independent values (block 268).

After each subspace has been fitted (block 270), the calculation of each combination of output values as a function of input values at the desired table tonal resolution is begun (block 272). The table indices for a given point (output value combination) are converted to device independent values (block 274), and a determination is made as to which subspace the point falls into (block 276). If the subspace is not in the output gamut (block 278), the point is assigned the closest color value (block 280; see also block 256). If the subspace is within the gamut, the subspace parameters are use to compute the device dependent values for the point (block 282). The values are placed into the lookup table (block 284), and the routine is repeated until all points have been processed (block 286).

A regression plot of the resulting table may be displayed to verify results (block 288). The table is then written to an appropriate memory device (block 290) for later use with actual image data. The output calibration is then completed (block 292).

A second approach is to perform a localized fit for each data point throughout the color space gamut. Having correlated a plurality of points which have been scanned and colorimetrically measured, an unknown point is selected. Its value is determined by identifying a pre-determined number, for example three, of the nearest points which have been empirically determined. The regression of the uniform color space data for the point onto the RGB or CMY data is performed individually for that point alone.

This second technique is considerably slower than the approach utilizing subspaces described above. However, the results are of far greater accuracy. Nonetheless, either approach produces acceptable results, and may be used depending upon the output results requirements.

In either case, but particularly using the subspace approach, some smoothing means must be applied to the generated look-up table. Otherwise, discontinuities between subspaces can result, which in the final image will produce unwanted shade lines and the like. One possible approach is to perform the regression of uniform color space onto RGB or CMY wherein the coefficients are adjusted or weighted as the points move from the center of a subspace toward and into an adjoining subspace. A second possible approach is to average each point with some predetermined number of points closest thereto.

The results of the calibration, regression and smoothing procedures are entered into a table whose entry indices are RGB or CMY and whose output is sole color space XYZ or vice versa. It is important to realize that most other color spaces are analytical transformations of XYZ. Therefore, any color space coordinates other than XYZ may be used, for example those of a uniform color space, as the output of the tables. This can be important in enabling color processing to be performed colorimetrically within a uniform color space.

It should also be recognized that once the imaging system is stable, colorimetric calibration of an input or an output device is a one-time procedure. Since the calibration is colorimetric, a different input or output device may be substituted simply by repeating the calibration for that particular device.

Unfortunately, many input data pixels may have color coordinates that do not fall within the output color gamut. Several methods have been developed to deal with the situation wherein input image colors lie outside the range of the gamut possible from the output colorant palette. In one embodiment, an irreproducible color is brought to the edge of the gamut by determining the shortest vector distance from the color to the gamut. In another embodiment, the achromatic component is preserved as nearly as possible and only the chromatic components are adjusted to bring the color to the gamut in such a way that hue constancy is nearly preserved. In yet another embodiment, the colors are not clipped. Rather, all colors are compressed such that the range of input colors just fits within the range of output colors. This compression can also be done selectively and non-linearly, such that for every quantized achromatic level and hue level, the chromatic component is compressed to fit within the output range possible for the chromatic and achromatic levels while preserving hue as nearly as possible. Similar compressions can be performed as a function of saturation, lightness, hue or any other color metric.

Particularly for gamut mismatch correction, the uniform color space $L^*,u^*,v^*$ is advantageous. Since the achromatic information is represented by the axis lying along the axis of a cylinder, processing such information separately is relatively simple. Similarly, the hue may be preserved by operating along a constant hue angle. Of course, the processing may be performed while maintaining any of the color space coordinates constant, and various ones or combinations thereof may be desirable in various situations.

A similar operation can be performed when the gamut of the input device is smaller than the gamut of the output device. While not as common, expansions can be performed on the color data to take full advantage of the output capabilities of the device.

This color processing can be performed in both an image independent and image dependent manner. In the case of image independent processing, the entire input gamut of the input device is considered when performing color processing to establish the data look-up tables. This may be preferable when speed is a factor, since a gamut comparison need be made only one time. As an alternative, however, an image dependent approach may be taken wherein only the gamut of the input image as recorded by the input device is used in generating the look up table. When time is not a factor, this may be a preferred approach, since full advantage of the output gamut may be taken. This is in contrast to the image independent case, in which a portion of the output gamut may be unused since it corresponds to a portion of the input gamut containing no input data.

The processed image data is passed from the digital image processing subsystem 150 to a data buffer and synchronization subsystem 152 which serves to buffer and synchronize the image data with a laser beam positioning system 106A of the output scanner controller 106 via an interface and control circuit 153. The processed image data from the data buffer and synchronization subsystem 152 passes to the modulation controller subsystem 154 wherein amplitude and/or pulse width signals are selected to correspond to the processed image data. The transformation of the processed image data into amplitude and/or pulse width signals is performed by addressing at least one pulse width/amplitude modulation (PWAM) table 156, with a plurality of PWAM tables 156 being shown in the modulation controller subsystem 154. In the illustrated embodiment, all digital image processing is performed in the digital image processing subsystem 150; however, it should be apparent that the processing can be shared among the subsystems 150, 152, 154.

The PWAM table 156 or plurality of tables 156 contain desired amplitude and/or pulse width modulation information which is passed to the output scanner controller 106. This information read from the PWAM table 156 or tables 156 determines the pulse width and/or the amplitude of the laser beam generated by the laser 108 which is applied to the light modulator 114 as shown in FIG. 1. The information contained in the PWAM table 156 or tables 156 can be selected based on a variety of information including the characteristics of the media to be imaged, including its color characteristics, various parameters of the imaging system 100 including intensity of the exposure source and scan rate of the writing laser, the particular color which is to be imaged, and the characteristics of the light modulator 114 being used. One or more of these or other system/media parameters may be provided on a static basis or on a dynamic feedback basis to optimize the images which are produced.

Other details regarding the PWAM tables may be found by reference to the parent application, U.S. patent application Ser. No. 048,156, filed May 11, 1987, which is hereby incorporated by reference.

While the methods herein described constitute preferred embodiments of this invention, it is to be understood that the invention is not limited to these precise methods, and that changes may be made in either without departing from the scope of the invention, which is defined in the appended claims.

What is claimed is:

1. A method of converting input color data to output color data comprising the steps of:
    calibrating in a first calibration an input device to an intermediate color space;
    calibrating in a second calibration an output device to said intermediate color space;
    collecting said input color data from said input device;
    converting said input color data to intermediate color space data in accordance with said first calibration;
    outputting said color data to said output device;
    wherein said converting of said intermediate color space data to said output color data includes processing said intermediate color space data for matching an input gamut to an output gamut for said output device, and wherein said intermediate color space is a uniform color space;
    said processing includes identifying at least one unprintable device independent color output value which, when converted to a device dependent color output value, cannot be represented by said output device, and determining an adjusted device dependent color output value for representing said device independent color output value which is within said output gamut;
    said adjusted device dependent color output value being determined within said intermediate color space;
    said adjusted device dependent color value being determined as the shortest vector distance within said intermediate color space between said unprintable color output value and a color output value which is printable by said output device.

2. The method as defined in claim 1, wherein said input gamut comprises the full gamut of said input device.

3. The method as defined in claim 1, wherein said input gamut comprises the full gamut of an input image.

4. The method as defined in claim 1, wherein said shortest vector value distance is determined while maintaining one coordinate within said intermediate color space as constant.

5. The method as defined in claim 4, wherein said intermediate color space is defined by the coordinates lightness, chroma and hue.

6. The method as defined in claim 5, wherein said one coordinate maintained as constant is lightness.

7. The method as defined in claim 6, wherein said coordinate hue is also maintained as constant.

8. A method of converting input color data to output color data comprising the steps of:
    calibrating in a first calibration an input device to an intermediate color space;
    calibrating in a second calibration an output device to said intermediate color space;
    collecting said input color data from said input device;
    converting said input color data to intermediate color space data in accordance with said first calibration;
    converting said intermediate color space data to said output color data in accordance with said second calibration; and
    outputting said color data to said output device;
    wherein said converting of said intermediate color space data to said output color data includes processing said intermediate color space data for matching an input gamut to an output gamut for said output device, and wherein said intermediate color space is a uniform color space;
    said processing includes identifying at least one unprintable device independent color output value which, when converted to a device dependent color output value, cannot be represented by said output device, and determining an adjusted device dependent color output value for representing said device independent color output value which is within said output gamut;
    said adjusted device dependent color output value being determined within said intermediate color space;
    said adjusted device dependent color value being determined by maintaining at least one coordinate within said intermediate color space as constant, and compressing all color input values along at least a second coordinate between zero and said unprintable coordinate value until said unprintable value is within said output color gamut.

9. The method as defined in claim 8, wherein said intermediate color space is defined by the coordinates lightness, chroma and hue.

10. The method as defined in claim 9, wherein said second coordinate is chroma.

11. The method as defined in claim 8, wherein said input gamut comprises the full gamut of said input device.

12. The method as defined in claim 8, wherein said input gamut comprises the full gamut of an input image.

13. A method of converting input color data to output color data comprising the steps of:
- calibrating in a first calibration an input device to an intermediate color space;
- calibrating in a second calibration an output device to said intermediate color space;
- collecting said input color data from said input device;
- converting said input color data to intermediate color space data in accordance with said first calibration;
- converting said intermediate color space data to said output color data in accordance with said second calibration; and
- outputting said color data to said output device;
- wherein said converting of said intermediate color space data to said output color data includes processing said intermediate color space data for matching an input gamut to an output gamut for said output device, and wherein said intermediate color space is a uniform color space;
- said processing includes identifying at least one unprintable device independent color output value which, when converted to a device dependent color output value, cannot be represented by said output device, and determining an adjusted device dependent color output value for representing said device independent color output value which is within said output gamut;
- said adjusted device dependent color output value being determined within said intermediate color space;
- said adjusted device dependent color value being determined by maintaining at least one coordinate within said intermediate color space as constant, and clipping all color input values along at least a second coordinate between the outer edge of said output color gamut and said unprintable coordinate value such that said unprintable value is at said outer edge of said output color gamut.

14. The method as defined in claim 13, wherein said intermediate color space is defined by the coordinates lightness, chroma and hue.

15. The method as defined in claim 14, wherein said second coordinate is chroma.

16. The method as defined in claim 13, wherein said output gamut comprises the full gamut of said input device.

17. The method as defined in claim 13, wherein said input gamut comprises the full gamut of an input image.

18. A method of converting input color data to output color data, comprising the steps of:
- calibrating in a first calibration an input device to an intermediate color space, said intermediate color space defining an input gamut;
- calibrating in a second calibration an output device to said intermediate color space;
- collecting said input color data from said input device;
- converting said input color data to intermediate color space data in accordance with said first calibration;
- converting said intermediate color space data to said output color data in accordance with said second calibration; and
- outputting said color data to said output device;
- said first calibration comprising the steps of:
- measuring colorimetrically a plurality of color patches to obtain a set of device independent color input values corresponding to said patches;
- measuring with said input device said patches to obtain a set of device dependent color input values corresponding to said patches;
- dividing said input gamut into a plurality of subspaces;
- correlating said device independent and said device dependent color input values for said patches, by separately defining a relationship between said device independent and said device dependent color input values for each of said subspaces;
- calculating other device independent color input values from said set to correspond to input not represented by said patches;
- said calculating of said other device independent color input values being performed separately for each of said subspaces using said relationships; and
- creating from said device independent and said device dependent color input values an input lookup table mapping said input color data to said intermediate color space data.

19. The method as defined in claim 18, comprising the further step of smoothing said device independent color input values over said subspaces.

20. The method as defined in claim 19, wherein said smoothing is performed by interpolating at least some of said device independent color input values using a weighted average of values interpolated using the one of said relationships for said subspace in which said color input value is located and another of said relationships from at least one of said subspaces adjacent thereto.

21. The method as defined in claim 19, wherein said smoothing is performed by, following said interpolating, averaging each of said device independent color input values with a predetermined number of closest color input values thereto.

22. A method of converting input color data to output color data comprising the steps of:
- calibrating in a first calibration an input device to an intermediate color space;
- calibrating in a second calibration an output device to said intermediate color space, said intermediate color space defining an output gamut;
- collecting said input color data from said input device;
- converting said input color data to intermediate color space data in accordance with said first calibration;
- converting said intermediate color space data to said output color data in accordance with said second calibration; and
- outputting said color data to said output device;
- said second calibration comprising the steps of:
- printing with said output device a plurality of color patches to obtain a set of device independent color output values;
- measuring colorimetrically said patches to obtain a set of device independent color output values corresponding to said patches;
- dividing said output gamut into a plurality of subspaces;
- correlating said device independent and said device dependent color output values for said patches, by separately defining a relationship between said device independent and said device dependent color output values for each of said subspaces;

calculating other device independent color output values from said set to correspond to output not represented by said patches;

said calculating of said other device independent color output values being performed separately for each of said subspaces using said relationships; and creating from said device independent and said device dependent color output values an output lookup table mapping said intermediate color space data to said output color data.

23. The method as defined in claim 22, comprising the further step of smoothing said device independent color output values over said subspaces.

24. The method as defined in claim 23, wherein said smoothing is performed by interpolating at least some of said device independent color output values using a weighted average of values interpolated using the one of said relationships for said subspace in which said color output value is located and another of said relationships from at least one of said subspaces adjacent thereto.

25. The method as defined in claim 23, wherein said smoothing is performed by, following said interpolating, averaging each of said device independent color output values with a predetermined number of closest color output values thereto.

* * * * *

UNITED STATES PATENT AND TRADEMARK OFFICE
CERTIFICATE OF CORRECTION

PATENT NO. : 4,941,038

DATED : July 10, 1990

INVENTOR(S) : Eric Walowit

It is certified that error appears in the above-identified patent and that said Letters Patent is hereby corrected as shown below:

Column 11, following line 50, insert --converting said intermediate color space data to said output color data in accordance with second calibration; and--;

Column 13, line 49 "output" should read --input--.

Signed and Sealed this

Second Day of June, 1992

Attest:

DOUGLAS B. COMER

*Attesting Officer*    *Acting Commissioner of Patents and Trademarks*

UNITED STATES PATENT AND TRADEMARK OFFICE
CERTIFICATE OF CORRECTION

PATENT NO : 4,941,038
DATED : July 10, 1990
INVENTOR(S): Eric Walowit

It is certified that error appears in the above-identified patent and that said Letters Patent is hereby corrected as shown below:

Column 14, line 57, "independent" should read -- dependent -- .

Signed and Sealed this

Ninth Day of December, 1997

Attest:

*Attesting Officer*

BRUCE LEHMAN

*Commissioner of Patents and Trademarks*